May 19, 1931.  F. J. DAY  1,805,809
COOLING APPARATUS
Filed April 1, 1929
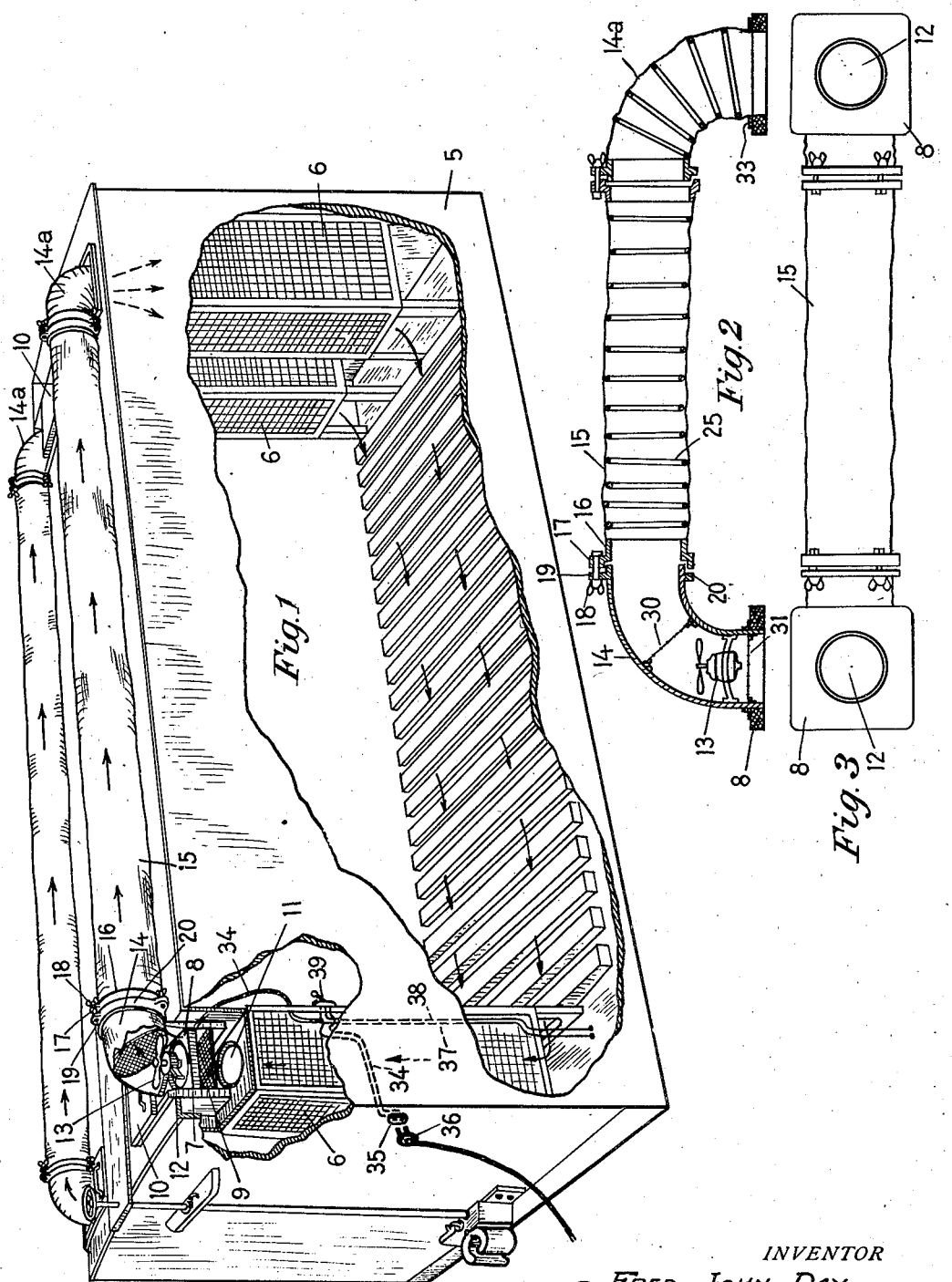
INVENTOR
FRED JOHN DAY
BY Raymond L. Barton
ATTORNEY Patented May 19, 1931

1,805,809

UNITED STATES PATENT OFFICE

FRED JOHN DAY, OF LOS ANGELES, CALIFORNIA

COOLING APPARATUS

Application filed April 1, 1929. Serial No. 351,584.

In this specification, and the accompanying drawings, I shall describe and show a preferred form of my invention, and shall specifically mention certain of its more important objects. I do not limit myself to the forms described, since various changes and adaptations may be made therein without departing from the essence of my invention as hereinafter claimed, and objects and advantages, other than those specifically mentioned, are included within its scope.

This invention relates to improved equipment for treating perishable products.

In the storage of perishable products, or in their preparation for transportation, it is essential that the condition of the atmosphere be such that upon their reception in the various places to which they are destined, that they will be subjected to a change of temperature to bring about a state of preservation whereby growth will be immediately retarded, thus eliminating the action of fungi and prevent deleterious growths.

This treatment consists in conditioning the air in such a manner as will quickly reduce the temperature thereof through means having a low cost and which is simple and easy to operate.

In treating perishable products in this manner it is desirable to pre-cool refrigerator cars prior to and during the reception of the fruit, and it is one advantage and a prime object of the invention to pre-cool the car during the process of loading.

Especially is the present invention of paramount importance for its facility of installation on cars remotely switched in yards where railroad tracks make them inaccessible to the approach of automobiles, and where other means for pre-cooling is impractical.

After refrigerator cars are initially iced it has formerly required from six to seven hours to pre-cool them. With the present method this can be done in four hours, and in the transportation of some vegetables, such as cauliflower, it is not necessary to replenish the ice used in pre-cooling.

Cauliflower is packed for shipment at a field heat or pulp temperature of from sixty degrees to seventy degrees Fahrenheit, cantaloupes from ninety degrees to one-hundred degrees Fahrenheit.

Such fruit unless properly introduced at a low temperature will deteriorate and decay because the pulp temperature would cause the fruit to develop beyond the proper state of maturity.

Furthermore, cauliflower unless properly pre-cooled will in a short time start growing, causing spread, ricey heads and jackets to turn yellow.

Such conditions existing in fruits and vegetables diminishes the richness of their flavor and consequently reduces the quantity and value of the sale thereof.

Experiments with strawberries have shown that within twenty-four hours they start deteriorating on account of retaining their pulp temperature or field heat. With the present invention fruits of this character can be pre-cooled in three or four hours, shipped to distant markets and arrive in the same condition as when they started.

Peaches picked from trees unless pre-cooled, will start to rot in two to three days after being placed in cold storage. Such fruits as hereinbefore described, when pre-cooled before shipping arrive at their destination at the same pre-cooled temperature which is steadily maintained during transit with saving of ice of from thirty-five to fifty per cent in the summer months when standard refrigeration is necessary.

Further objects may hereinafter appear when viewed in the light of the description following taken in conjunction with the accompanying drawings which illustrate what is at present deemed to be a preferred embodiment of the invention and wherein, Fig. 1 is a perspective view of the complete apparatus as applied to a refrigerator car, parts being broken away to show interior construction.

Fig. 2 is a mid-sectional view of the detachable air conduit and its attachments.

Fig. 3 is a bottom plan view of Fig. 2.

Referring in detail to the drawings, the car body 5 has at each corner an ice bunker or compartment 6 which, for the most part, is of standard general construction. Each of these bunkers has a set of hatch opening bevel blocks 7 and a hatch plug (not shown) which is supplanted by the plug 8 of applicant's device. Said plug 8 is fitted within the flue 9 formed by said blocks 7, said flue being located above the bunker 6 and communicating with the outlet 11 of said bunker. In Fig. 1 the hatch covers 10 are shown moved laterally away from the flue openings 9 in order to provide for installation of the apparatus of this invention.

Said hatch plug 8 is provided with a port 12 above which is stationed the fan 13. Said fan 13 is housed within a sheet metal elbow 14 which, in turn, communicates with a canvas conduit 15. Said canvas conduit 15 is preferably detachably secured to said elbow by means of a female collar 16 having a plurality of apertured ears 17 to receive thumb screws 18. Said thumb screws 18 are adapted to screw into ears 19 provided on a male flange 20 with which elbow 14 is furnished.

The canvas conduit 15 and its canvas elbow 14a, provided with a series of internal resilient steel ribs 25 which keep said conduit and elbow in a diametrically expanded condition, but which allows them to be collapsed in an endwise manner for portability. Said flexible conduit and elbow are desirably provided with waterproof air-tight canvas walls.

Both ends of the canvas conduit 15 are desirably provided with similar means for connecting with the elbows 14, and 14a as more fully shown in Figs. 2 and 3. Hatch plugs 8 which terminate the lower portions of albows 14 and 14a are portable together with the remainder of the removable part of the apparatus. Desirably a screen 30 is placed above each fan 13 within the elbow 14, and a screen 31 below such elbow to safeguard the fan. Said screen 31 may be placed within the rigid elbow, as shown in Fig. 2 or within flue 9 as shown in Fig. 1.

The flexible elbow 14a may be attached to the hatch plug 8 by means of a canvas collar 33 tacked or otherwise held in place.

The detachability and portability of the flexible conduits and their connections makes the apparatus particularly applicable to refrigerator cars in transit and also while the cars are being switched from one yard to another before departure. The device can be kept in constant use by being removed from a car as soon as such car and its contents have been pre-cooled to the proper degree, and then placed on another car where its use is required. Or it may be used on a car during an entire transcontinental trip, operating it under the regulation of a thermostat, to maintain an even temperature. Such a thermostat (not shown) is easily procured and installed and does not constitute a part of the invention. Conduits 15 are desirably made of water-proof, air-tight canvas, and they are adapted to overlie and rest directly upon the car roof during use.

The motor fan 13 is provided with a current supply conduit 34 having a plug 35 for detachably securing to an outside connection 36. Wires 37 and 38 are also provided for direct connection with the electric current line of the train, thus to supply current, when desired, from the train dynamo, (not shown). The two-way switch 39 is provided to make either electrical connection, as desired.

In operation, after the bunkers 6 have been filled properly with ice, and after the well known hatch covers 10 and the hatch plugs (not shown) have been removed, the entire portable apparatus comprising the endwise collapsible conduits 15 together with the elbows 14 and 14a, is installed as shown in Fig. 1. The electrical connection is then made by connecting the plug 36 to socket 35.

The circuitous route taken by the air in performing its cooling function is indicated by the arrows in Fig. 1.

In order to hasten the pre-cooling process salt is sprinkled upon the ice in the bunkers causing a copious flow of water therefrom and also causing the air to become more rapidly cooled as it passes through said bunkers.

The apparatus not only operates efficiently but its portable portion is readily connected to and disconnected from the standard type of refrigerator car now in general use.

I claim:

1. In apparatus of character described, in combination, a car body having ice bunkers at opposite ends, a fabric tube adapted to be detachably mounted upon the top of said car to form a portion of means for circulating air through said bunkers, and means within said tube to maintain it in diametrical extension while permitting its longitudinal collapse.

2. In apparatus of character described, in combination, a car body having ice bunkers at opposite ends, a fabric tube adapted to be detachably mounted upon the top of said car to form a portion of means for circulating air through said bunkers, and resilient ribs within said tube to maintain it in diametrical extension while permitting its longitudinal collapse.

FRED JOHN DAY.